(12) United States Patent
Hanisko

(10) Patent No.: US 6,494,102 B2
(45) Date of Patent: Dec. 17, 2002

(54) MAGNETOSTRICTIVE STRESS SENSOR

(75) Inventor: John-Cyril P. Hanisko, Southfield, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/759,731

(22) Filed: Jan. 12, 2001

(65) Prior Publication Data

US 2002/0092358 A1 Jul. 18, 2002

(51) Int. Cl.[7] .................................................. G01B 7/16
(52) U.S. Cl. ........................................................ 73/779
(58) Field of Search ............................ 73/779, 862.331, 73/862.332, 862.333, 862.334, 862.335

(56) References Cited

U.S. PATENT DOCUMENTS

| | | |
|---|---|---|
| 4,401,483 A | 8/1983 | Jin |
| 4,566,338 A | 1/1986 | Fleming et al. |
| 4,590,807 A | 5/1986 | Kobayashi et al. |
| 4,627,298 A * | 12/1986 | Sahashi et al. ............. 324/209 |
| 4,750,371 A * | 6/1988 | Kobayashi et al. ....... 310/68 B |
| 4,760,745 A | 8/1988 | Garshelis |
| 4,762,008 A | 8/1988 | Kobayashi et al. |
| 4,784,003 A | 11/1988 | Kimura et al. |
| 4,805,466 A * | 2/1989 | Schiessle et al. ....... 73/862.336 |
| 4,891,992 A | 1/1990 | Kobayashi et al. |
| 4,933,580 A | 6/1990 | Ishino et al. |
| 4,976,160 A | 12/1990 | Dobler et al. |
| 4,979,399 A | 12/1990 | Klauber et al. |
| 5,144,846 A | 9/1992 | Klauber et al. |
| 5,351,555 A | 10/1994 | Garshelis |
| 5,422,621 A | 6/1995 | Gambino et al. |
| 5,431,063 A | 7/1995 | Yasui |
| 5,465,757 A * | 11/1995 | Peters .................... 137/625.65 |
| 5,542,304 A * | 8/1996 | Sasada et al. ............ 73/862.06 |
| 5,591,925 A | 1/1997 | Garshelis |
| 5,646,356 A | 7/1997 | Ling et al. |
| 5,725,681 A | 3/1998 | Ishitobi et al. |
| 5,850,045 A | 12/1998 | Harada et al. |
| 5,989,674 A | 11/1999 | Marinero et al. |
| 6,047,605 A | 4/2000 | Garshelis |

* cited by examiner

*Primary Examiner*—Max Noori
(74) *Attorney, Agent, or Firm*—Tarolli, Sundheim, Covell, Tummino & Szabo L.L.P.

(57) ABSTRACT

A sensor (10) for sensing stress applied to an object (12), wherein the sensor includes a first core member (e.g., 100) aligned substantially parallel to the direction of applied stress and a second core member (e.g., 200) aligned substantially perpendicular to the direction of applied stress. A central core portion (18) connects the first and second core members (e.g., 100 and 200). An excitation coil (20) is operatively associated around the central core portion (18). The excitation coil (20) produces magnetic flux within the object (12) and the first and second core members (e.g., 100 and 200). A first detection coil (e.g., 104) is operatively associated around the first core member (e.g., 100). A second detection coil (e.g., 204) is operatively associated around the second core member (e.g., 200). The first and second detection coils (e.g., 104 and 204) detect changes in the magnetic flux as affected by applied stress.

4 Claims, 2 Drawing Sheets

MAGNETOSTRICTIVE STRESS SENSOR

TECHNICAL FIELD

The present invention is related to a sensor for sensing stress and more particularly to a sensor that utilizes magnetostrictive properties of material to sense stress caused by torque.

BACKGROUND OF THE INVENTION

Magnetostrictive sensors for sensing stress are relatively well known. Further, magnetostrictive sensors for sensing torque via stress sensing are known. In general, magnetostrictive sensors utilize the magnetostrictive properties associated with ferromagnetic materials to sense stress, from torque or the like, applied to an object.

Ferromagnetic materials have magnetostrictive properties that have an interaction relationship with mechanical energy. For instance, when a mechanical energy, such as an external force, is applied to a ferromagnetic material, magnetic properties, such as magnetic permeability, of the material change.

U.S. Pat. No. 5,144,846 discloses a magnetostrictive stress and torque sensor. The patent discloses that stress and torque are sensed based on the principle of magnetostriction.

Similarly, U.S. Pat. No. 5,850,045 discloses a magnetostrictive stress sensor and U.S. Pat. No. 4,933,580 discloses a magnetostrictive torque sensor.

SUMMARY OF THE INVENTION

In accordance with one aspect, the present invention provides a sensor for sensing stress applied to an object. A first core member is aligned substantially parallel to the direction of applied stress. A second core member is aligned substantially perpendicular to the direction of applied stress. A central core portion connects the first and second core members. An excitation coil is operatively associated around the central core portion. The excitation coil produces a magnetic flux within the object and the first and second core members. A first detection coil is operatively associated around the first core member. A second detection coil is operatively associated around the second core member. The first and second detection coils detect changes in magnetic flux as affected by applied stress.

In accordance with another aspect, the present invention provides a sensor for sensing stress applied to an object. A grain-aligned portion has grains aligned in a direction parallel or perpendicular to the direction of stress. The grain-aligned portion is operatively associated with the object such that stress applied to the object is applied to the grain-aligned portion in a direction parallel or perpendicular to the direction of grain alignment. A core is located proximate to the grain-aligned portion. The core includes a center portion and first and second members. The first member extends from the center portion in a direction substantially parallel to the direction of grain alignment and terminates at a first end distal from the center portion. The second member extends from the center portion in a direction substantially perpendicular to the direction of grain alignment and terminates at a second end distal from the center portion. An excitation coil generates magnetic flux within the core and the grain-aligned portion. The coil is operatively associated around the core near the center portion of the core. A first detection coil develops a first metric in response to the generated magnetic flux. The first metric changes when the magnetic flux changes as a result of applied stress. The first detection coil is operatively associated around the first member near the first end of the first member. A second detection coil develops a second metric in response to the generated magnetic flux. The second metric changes when the magnetic flux changes as a result of applied stress. The second detection coil is operatively associated around the second member near the second end of the second member. The first and second detection coils are operatively connected such that the first and second metrics are summed together to increase the sensitivity of the sensor.

In accordance with another aspect, the present invention provides a sensor for sensing stress applied to an object. A grain-aligned portion has grains aligned in a direction parallel or perpendicular to the direction of stress. The grain-aligned portion is operatively associated with the object such that stress applied to the object is applied to the grain-aligned portion in a direction parallel or perpendicular to the direction of grain alignment. First detection means, aligned parallel to the direction of stress, detects changes in a characteristic of the portion that changes as a result of applied stress. The first detection means develops a first detection metric that changes in response to changes in the characteristic that occur in a direction parallel to the direction of applied stress. The first detection means outputs a first signal indicative of the changes in the metric. Second detection means, aligned perpendicular to the direction of stress, detects changes in the characteristic. The second detection means develops a second detection metric that changes in response to changes in the characteristic that occur in a direction perpendicular to the direction of applied stress. The second detection means outputs a second signal indicative of the changes in the metric. The first and second detection means are operatively connected such that the first and second output signals are summed together.

In accordance with another aspect, the present invention provides a sensor for sensing stress applied to an object. The sensor is operatively associated with the object such that stress applied to the object is also applied to the sensor. Detection means detects changes in a characteristic of the object that changes as a result of applied stress. The detection means develops a detection metric functionally related to the characteristic. The detection metric changes when the characteristic changes. The sensor outputs a signal indicative of more than twice the change in the developed metric.

In accordance with yet another aspect, the present invention provides a sensor for sensing stress applied to an object. A grain-aligned portion has grains aligned in a direction parallel or perpendicular to the direction of stress. The grain-aligned portion is operatively associated with the object such that stress applied to the object is applied to the grain-aligned portion in a direction parallel or perpendicular to the direction of grain alignment. Detection means detects changes in a characteristic of the portion. The characteristic changes as a result of applied stress. The detection means develops a detection metric functionally related to the characteristic. The detection metric changes in response to changes in the characteristic. The sensor outputs a signal indicative of more than two times the change in the developed metric.

In accordance with still another aspect, the present invention provides a sensor for sensing torque applied to a shaft. A magnetostrictive portion is associated with the shaft such that torque applied to the shaft stresses the magnetostrictive portion. A magnetic core is located proximate the magnetostrictive portion. The core has a central portion and a plurality of portions remote from the central portion. An electrically conductive excitation coil produces a magnetic flux in the core. The excitation coil is operatively associated around the core near the central portion of the core. A plurality of electrically conductive detection coils, across which a voltage is developed in response to the produced magnetic flux as affected by torque, are operatively associated around the remote portions of the core.

In accordance with yet still aspect, the present invention provides a sensor for sensing torque applied to a shaft. A magnetostrictive portion is associated with the shaft such that torque applied to the shaft stresses the magnetostrictive portion. A magnetic core is located proximate the magnetostrictive portion. The core has an origin and an arm extending there-from. An electrically conductive excitation coil produces a magnetic flux in the core. The excitation coil is operatively associated around the core near the origin of the core. An electrically conductive detection coil, across which a voltage is developed in response to the produced magnetic flux as affected by torque, is operatively associated around the arm of the core.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Magnetostrictive properties of a ferromagnetic material are related to applied mechanical energy. The magnetostrictive properties are, at least in part, functionally related to grain alignment within the material, where grain alignment corresponds to the direction of magnetic moments and electron spins within the material.

When a stress is applied to a ferromagnetic material, for example, magnetic moments within the material rotate and electron energies change. This causes a change in magnetic properties within the material, such as a change in the permeability of the material, where permeability is a measure of the ease with which a magnetic field or magnetic lines of flux can be induced within the material.

Figure 1A:
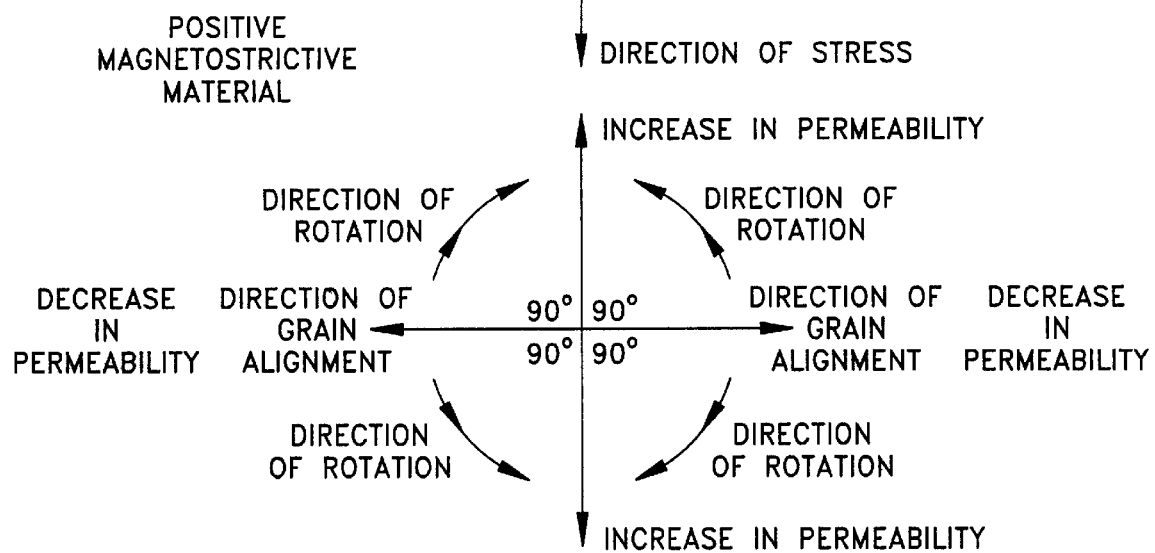
FIGS. 1A and 1B illustrate the relationship between grain orientation, stress and permeability for positive (FIG. 1A) and negative (FIG. 1B) magnetostrictive materials.
Figure 1B:
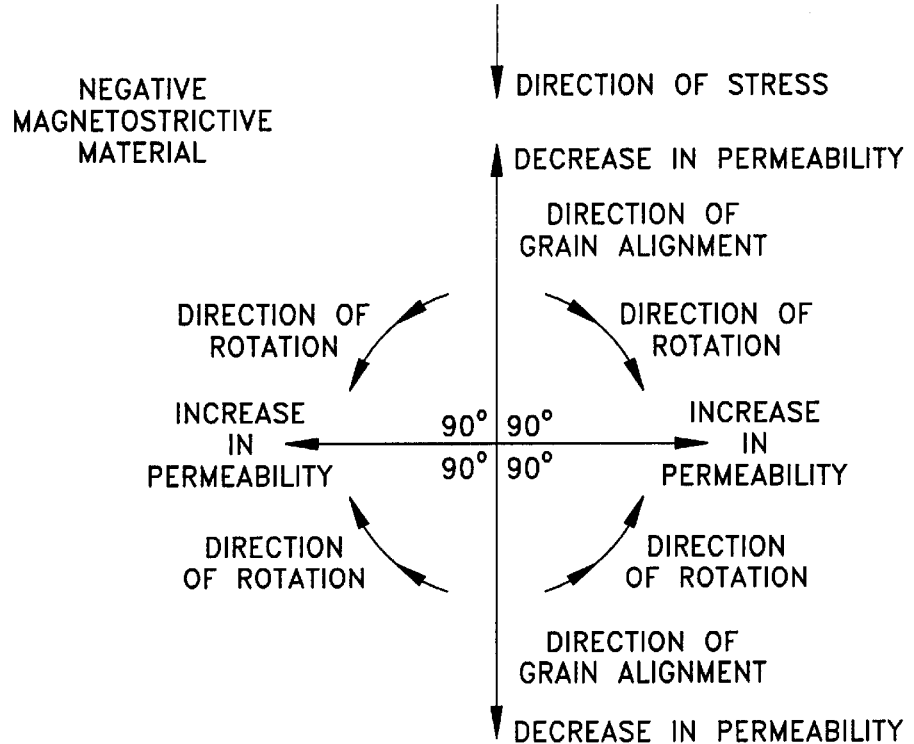

With reference now to FIGS. 1A and 1B, materials having magnetostrictive properties are either positive or negative. In positive magnetostrictive materials (FIG. 1A), when a stress is applied to the material, magnetic moments tend to rotate toward a direction parallel to the direction of applied stress. This movement of magnetic moments within the material causes the permeability of positive magnetostrictive materials to increase in a direction parallel to the direction of stress. Thus, when a stress is applied to a positive magnetostrictive material, a magnetic field is more easily induced in the material in a direction parallel to the direction of stress.

In negative magnetostrictive materials (FIG. 1B), when a stress is applied to the material, magnetic moments tend to rotate away from the direction of applied stress. This movement of magnetic moments within the material causes the permeability of negative magnetostrictive materials to increase in a direction perpendicular to the direction of stress. Thus, when a stress is applied to a negative magnetostrictive material, a magnetic field is more easily induced in the material in a direction perpendicular to the direction of stress.

It is to be appreciated that, the more magnetic moments rotate as a result of applied stress, the greater the magnetic properties, such as the permeability, of the material changes. For positive magnetostrictive materials, therefore, where moments rotate toward the direction of stress, the moments should initially be aligned substantially perpendicular to the direction of stress. In this fashion, when stress is applied to the material, the moments rotate a full 90° to align themselves parallel to the direction of stress.

It is to be appreciated that this 90° movement is the maximum range of motion that the moments can rotate through to align themselves parallel to the direction of stress. For instance, if prior to the application of stress, the magnetic moments are aligned other than perpendicular to the direction of stress, the moments have an orientation with respect to the direction of stress that is acute in one direction and obtuse in the other. More particularly, the moments can either rotate through an angle that is acute to align themselves parallel to the direction of stress. Alternatively, the moments can rotate through an angle that is obtuse to align themselves parallel to the direction of stress.

Given the choice, the moments will choose to rotate through the lesser angle to align themselves parallel to the direction of stress. This lesser range of motion reduces the change in permeability of the material. Accordingly, as mentioned above, to maximize the change in permeability, the moments should initially be aligned perpendicular to the anticipated direction of stress. This maximizes the sensitivity of the sensor as the permeability or ease with which a magnetic field can be induced within the material switches from a direction perpendicular to the direction of stress to a direction parallel to the direction of stress.

With regard to negative magnetostrictive materials, where moments rotate away from the direction of stress, the moments should initially be aligned substantially parallel to the direction of stress. In this fashion, when stress is applied to the material, the moments rotate a full 90° to align themselves perpendicular to the direction of stress.

As with the positive magnetostrictive materials, it is to be appreciated that this 90° movement is the maximum range of motion that the moments can rotate through to align themselves perpendicular to the direction of stress. For instance, if prior to the application of stress, the magnetic moments are aligned other than parallel to the direction of stress, the moments have an orientation with respect to a direction that is perpendicular to the direction of stress that is acute in one direction and obtuse in the other. More particularly, the moments can either rotate through an angle that is acute to align themselves perpendicular to the direction of stress. Alternatively, the moments can rotate through an angle that is obtuse to align themselves perpendicular to the direction of stress.

Again, as with the positive magnetostrictive materials, given the choice, the moments will choose to rotate through the lesser angle to align themselves perpendicular to the direction of stress. This lesser range of motion reduces the change in permeability of the material. Thus, to maximize the change in permeability in the negative magnetostrictive materials, the moments should initially be aligned parallel to the anticipated direction of stress. This maximizes the sensitivity of the sensor as the permeability or ease with which a magnetic field can be induced within the material switches from a direction parallel to the direction of stress to a direction perpendicular to the direction of stress.

As mentioned above, magnetic moments correspond to the direction of grains within the material. Therefore, so that the moments are oriented for optimum sensitivity of the sensor, where the sensor is formed out of a positive magnetostrictive material, the grains are initially aligned in a direction substantially perpendicular to the anticipated direction of stress. Alternatively, where the sensor is formed out of a negative magnetostrictive material, the grains are initially aligned in a direction substantially parallel to the anticipated direction of stress.

Figure 2:
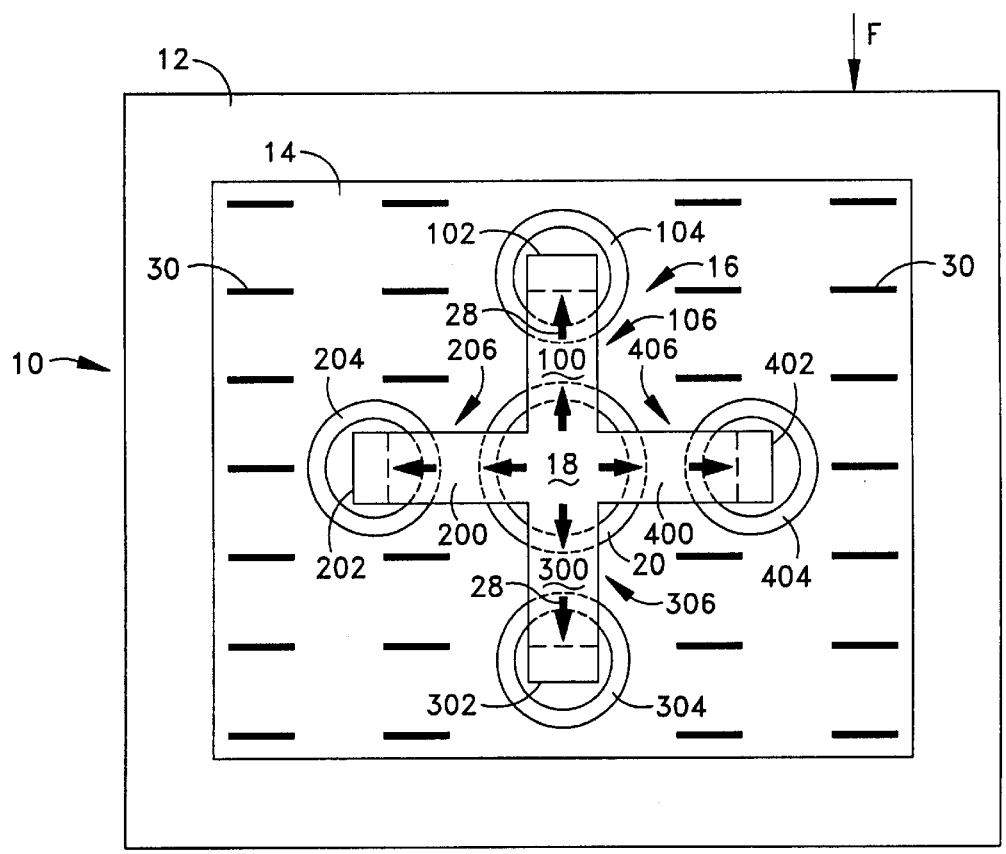
FIG. 2 is a top view of a stress sensor in accordance with the present invention.

With reference now to FIG. 2, a sensor 10 in accordance with the present invention, which utilizes the magnetostrictive properties associated with ferromagnetic materials to sense the stress applied to an object 12 is illustrated. In the example illustrated, a grain-aligned armature 14 is fixedly attached to the object 12. By grain-aligned it is meant that the grains 30 are generally oriented in one particular direction. By fixedly attached it is simply meant that the armature 14 is attached to the object such that stress applied to the object 12 is also applied to the armature. For instance, the armature 14 may be welded, glued, shrink fit, etc. to the object 12 so that stress applied to the object 12 is transferred to the armature 14.

The grain alignment is oriented so as to maximize the sensitivity of the sensor. In FIG. 2, the armature 14 is illustrated as being formed out of a positive magnetostrictive material in that the grains are aligned in a direction perpendicular to the anticipated direction of stress. Alternatively, if the armature 14 is formed out of a negative magnetostrictive material, the grains would be aligned in a direction parallel to the anticipated direction of stress. In this fashion, the moments rotate a full 90° when stress is applied to the material.

It is to be appreciated that the armature 14 can be any shape or size. The armature 14 merely needs to be joined, connected, or the like with the object 12 so that stress applied to the object is transferred to and experienced by the armature. Moreover, the armature 14 does not need to be a separate component. Rather, a portion of the object 12 can itself be grain-aligned so that a separate component, such as the armature 14, is not necessary. In this fashion, the grain-aligned portion of the object itself takes the place of the armature 14. For purposes of simplicity and ease of understanding, reference is made hereinafter to the armature 14 only and not to a grain-aligned portion of the object or any other grain-aligned components associated with the object 12.

With continuing reference to FIG. 2, the sensor 10 also includes a cross axis core 16 located near the grain-aligned armature 14. The core 16 can be formed out of any magnetic material. In the example shown, the core 16 includes four members 100, 200, 300, 400 that extend outwardly from the origin or center portion 18 of the core 16. Each of the members 100, 200, 300, 400 terminate at a respective end located distally from the center 18 of the core 16. For simplicity and ease of understanding, the members are numbered such that the first member 100 has a first end 102, the second member 200 has a second end 202, the third member 300 has a third end 302, and the fourth member 400 has a fourth end 402.

An excitation coil 20 is operatively associated around the center 18 of the core 16 and four detection coils 104, 204, 304, 404 are operatively associated around the four members 100, 200, 300, 400. More particularly, one detection coil is located near the end of each of the four members such that a first detection coil 104 is located near the first end 102 of the first member 100, a second detection coil 204 is located near the second end 202 of the second member 200, a third detection coil 304 is located near the third end 302 of the third member 300, and a fourth detection coil 404 is located near the fourth end 402 of the fourth member 400.

In the example illustrated, an external force is exerted downward on the object 12. This force applies a stress to the object 12 in the direction indicated by arrow F. It is to be appreciated that the applied force is an example. Other/different external forces can be applied and thus sensed for example, a rotational torque force can be applied.

In accordance with the present invention, two members 100 and 300 or 200 and 400 are oriented parallel to the direction of stress and two members 200 and 400 or 100 and 300 are oriented perpendicular to the direction of stress. As mentioned above, also in accordance with the present invention, depending upon the type of material used (positive magnetostrictive or negative magnetostrictive), the grains of the material are aligned parallel (negative magnetostrictive) or perpendicular (positive magnetostrictive) to the direction of stress.

In the example illustrated, the first and third members 100, 300 are oriented parallel to the direction of stress and the second and fourth members 200, 400 are oriented perpendicular to the direction of stress. However, it is to be appreciated that this orientation is for demonstrative purposes only, and that the orientation of the members could be reversed such that the second and fourth members 200, 400 are oriented parallel to the direction of stress and the first and third members 100, 300 are oriented perpendicular to the direction of stress.

Figure 3:
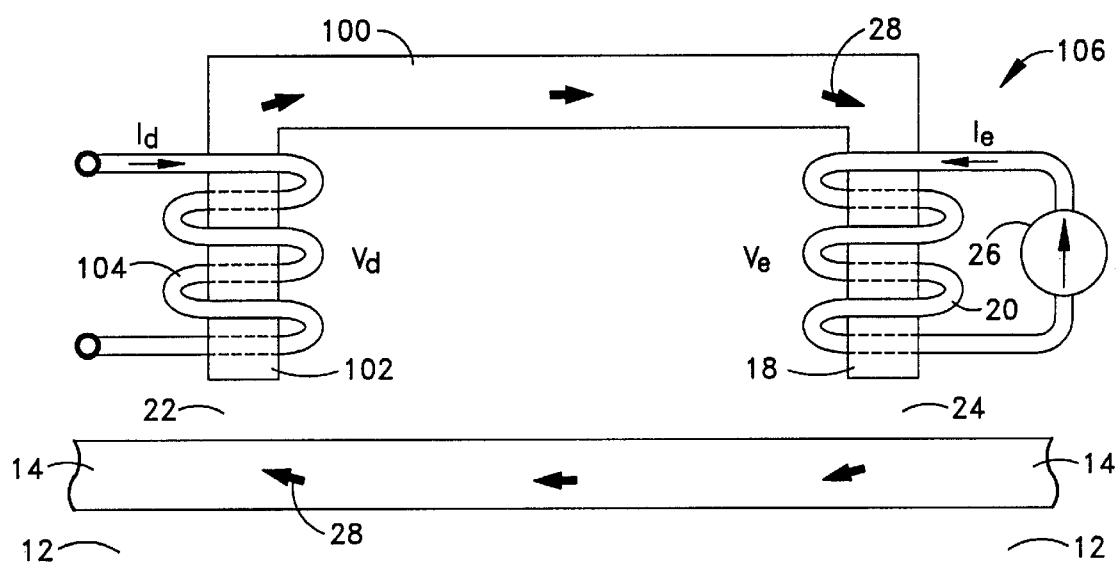
FIG. 3 is a schematic representation of one magnetic detection circuit of the sensor of FIG. 2.

With reference now to FIG. 3, the basic operation of the present invention is discussed. For simplicity and ease of understanding, FIG. 3 represents only one member (e.g., 100) shown in FIG. 2 and associated components. The excitation coil 20 is shown wrapped around the center 18 of the excitation core. The detection coil 104 is wrapped around the member 100 near the end 102 of the member.

In one respect, FIG. 3 can be considered a side view of the one member 100 and the associated components. It is to be appreciated that the member 100 shown in FIG. 3 is intended to be representative of each of the four members 100, 200, 300, 400 of the core 16.

As mentioned above, the core 16, and thus the member 100, is located near the grain-aligned armature 14. More particularly, the core 16 is located slightly above the armature 14 such that a small air gap 22 is present between the end 102 of the member 100 and the armature 14. Similarly, a small air gap 24 is also present between the center 18 of the core 16 and the armature 14.

A current source 26 is connected to the excitation coil 20 and drives current $I_e$ through the excitation coil. The current $I_e$ in the excitation coil 20 causes a voltage $V_e$ to be developed across the excitation coil. This voltage $V_e$, in turn, causes a magnetic flux 28 to be induced within a magnetic detection circuit 106, where the circuit 106 includes the member 100 of the core, the center portion 18 of the core, the two air gaps 22, 24, and the armature 14. The magnetic flux 28 induced within the member 100 causes a current $I_d$ to flow through the detection coil 104 and a voltage $V_d$ to be developed across the detection coil. It is to be appreciated that the developed current $I_d$ and/or voltage $V_d$ may hereinafter be referred to as metrics.

As mentioned above, when a stress is applied to the object 12, the stress is transferred to the armature 14 and the permeability of the armature changes due to the magnetostrictive properties of the armature 14. The change in permeability causes the magnetic flux 28 induced within the circuit 106 to change. The change in magnetic flux 28, in turn, causes a change in the current $I_d$ flowing through the detection coil 104 as well as a change in the voltage $V_d$ developed across the detection coil. All things being equal (e.g. the current source $I_e$ remaining constant or unchanged), the change in the voltage $\Delta V_d$ developed across the detection coil 104 is a result of the change in permeability only, where the change in permeability is itself only a result of the stress applied to the object 12. As such, the change in voltage $\Delta V_d$ developed across the detection coil 104 is indicative of the stress applied to the object 12. An output signal representative of the change in this metric can be developed in a known manner.

Each of the four members 100, 200, 300, 400 help to make up four separate magnetic detection circuits 106, 206, 306, 406, where each of the four circuits include one member of the core, the center portion 18 of the core, two respective air gaps and the armature 14.

Because two of the members 100 and 300 or 200 and 400 are aligned parallel to the direction of stress and the other two members 200 and 400 or 100 and 300 are aligned perpendicular to the direction of stress and further because the grains of the material are aligned to maximize the sensitivity of the sensor (e.g. perpendicular to the anticipated direction of stress for a positive magnetostrictive material or parallel to the anticipated direction of stress for a negative magnetostrictive material), the change in the voltage $\Delta V_{d100}$ and $\Delta V_{d300}$ or $\Delta V_{d200}$ and $\Delta V_{d400}$ developed across the two pairs of detection coils 100 and 300 or 200 and 400 is equal in magnitude but opposite in direction. More particularly, when stress is applied to the object, the voltage will increase to $+\Delta V_{d100}$ and $+\Delta V_{d300}$ or $+\Delta V_{d200}$ and $+\Delta V_{d400}$ across two coils 100 and 300 or 200 and 400 and decrease by an equal but opposite amount to $-\Delta V_{d200}$ and $-\Delta V_{d400}$ or $-\Delta V_{d100}$ and $-\Delta V_{d300}$ across the other two coils 200 and 400 or 100 and 300. It is to be appreciated that the change in voltage is maximized because the grains and members are aligned with the direction of stress to generate and sense the greatest swing in permeability that can result from the particular unit of applied stress.

By way of example only and not for the purposes of limiting the present invention, assume that the armature 14 is formed out of a positive magnetostrictive material as illustrated in FIG. 2 and that the grains 30 are therefore aligned perpendicular to the direction of stress so that when stress is applied to the armature, the magnetic moments rotate a full 90° to give the sensor 10 its maximum sensitivity. In this example illustrated, because the first and third members 100 and 300 are aligned parallel to the direction of stress, the change in permeability increases a maximum amount in the direction of the first and third members and decreases a maximum amount in the direction of the second and fourth members 200 and 400. As such, for the particular degree of stress applied, the magnetic flux 28 induced within the second and fourth circuits 206 and 406 decreases by a maximum amount and the magnetic flux induced within the first and third circuits 106 and 306 increases by a maximum amount. The increase in magnetic flux 28 in the first and third circuits 106 and 306 causes the voltages $\Delta V_{d100}$ and $\Delta V_{d300}$ developed across the first and third coils 104 and 304 to increase by a maximum amount. Similarly, the decrease in magnetic flux 28 in the second and fourth circuits 206 and 406 causes the voltages $\Delta V_{d200}$ and $\Delta V_{d400}$ developed across the second and fourth coils 206 and 406 to decrease by a maximum amount.

The decrease in magnetic flux within the second and fourth circuits 206 and 406 is equal but opposite to the increase in magnetic flux 28 in the first and third circuits 106 and 306. Accordingly, the change in voltage $\Delta V_{d200}$ and $\Delta V_{d400}$ across the second and fourth coils 204 and 404 is equal but opposite to the change in voltage $\Delta V_{d100}$ and $\Delta V_{d300}$ across the first and third coils 104 and 304.

The first and third coils 104 and 304 are connected in series so that their voltages and the changes thereto $\Delta V_{d100}$ and $\Delta V_{d300}$ are added together. Similarly, the second and fourth coils 204 and 404 are connected in series so that their voltages and the changes thereto $\Delta V_{d200}$ and $\Delta V_{d400}$ are added together.

Additionally, because the change in voltages $\Delta V_{d200}$ and $\Delta V_{d400}$ across the second and fourth coils are equal but opposite to the change in voltages $\Delta V_{d100}$ and $\Delta V_{d300}$ across the first and third coils, the two pairs of coils 104, 304 and 204, 404 are differentially connected so that the change in voltages across all of the coils are summed together as $\Delta V_{d100} + \Delta V_{d300} - (-\Delta V_{d200} - \Delta V_{d400})$. In this fashion, the sum of the change in voltages across the four coils enables the sensor 10 to output a signal indicative of the stress applied to the object 12 that is a fourfold $4\Delta V_d$ amplification of the change in voltage $\Delta V_d$ developed across any one of the detection coils 104, 204, 304, and 404, where the change in voltage developed across any one of the coils is indicative of the stress applied to the object. Outputting a signal indicative of the fourfold amplification of the change in voltage can be performed in any manner known in the art.

It is to be appreciated that the foregoing example is for illustrative purposes only and is not intended to limit the scope of the present invention. For instance, a negative magnetostrictive material may be used as the armature. Similarly, the second and fourth members 200 and 400 may be aligned parallel to the direction of stress instead of the first and third members 100 and 300.

Additionally, the present invention is not limited to merely sensing any one particular type of force, such as the downward force described above. For instance, the present invention may be utilized to sense torque applied to a shaft.

When torque is applied to a shaft, the direction of stress applied to the shaft is essentially at a 45° angle with respect to the axis of the shaft. As such, to maximize the sensitivity of the sensor 10, for a negative magnetostrictive material, the grains 30 would be aligned in a direction parallel to this 45° angle. For a positive magnetostrictive material, the grains 30 would be aligned in a direction perpendicular to this 45° angle. The magnetic moments would thus rotate a full 90° to maximize the change in permeability and the sensitivity of the sensor 10.

Additionally, as discussed above, two of the members 100 and 300 or 200 and 400 would be aligned parallel to the direction of stress, while the other two members 200 and 400 or 100 and 300 would be aligned perpendicular to the direction of stress. Thus, the change in voltage across each of the detection coils 104, 204, 304, and 404 would be maximized when torque is applied to the shaft. The four coils 104, 204, 304, and 404 would be connected as described above so that the sensor 10 can output a signal indicative of the stress applied to the object where the signal is a fourfold $4\Delta V_d$ amplification of the change in voltage $\Delta V_d$ developed across any one of the detection coils. Such a toque sensor may be used, for example, in conjunction with an electrically controlled power assist steering system to sense applied steering torque.

From the above description of the invention, those skilled in the art will perceive improvements, changes and modifications. Such improvements, changes and modifications are intended to be included within the scope of the appended claims.

Having described the invention, the following is claimed:

1. A sensor for sensing stress applied to an object, said sensor comprising:

a grain-aligned portion having grains aligned in a direction parallel or perpendicular to the direction of stress, said grain-aligned portion being operatively associated with the object such that stress applied to the object is applied to said grain-aligned portion in a direction parallel or perpendicular to the direction of grain alignment;

a core located proximate said grain-aligned portion, said core including a center portion and first and second members, said first member extending from said center portion in a direction substantially parallel to the direction of grain alignment and terminating at a first end distal from said center portion, said second member extending from said center portion in a direction substantially perpendicular to the direction of grain alignment and terminating at a second end distal from said center portion;

an excitation coil for generating magnetic flux within said core and said grain-aligned portion, said coil being operatively associated around said core near said center portion of said core;

a first detection coil that develops a first metric in response to the generated magnetic flux, said first metric changing when the magnetic flux changes as a result of applied stress, said first detection coil being operatively associated around said first member near said first end of said first member; and, a second detection coil that develops a second metric in response to the generated magnetic flux, said second metric changing when the magnetic flux changes as a result of applied stress, said second detection coil being operatively associated around said second member near said second end of said second member, said first and second detection coils being operatively connected such that the first and second metrics are summed together to increase the sensitivity of said sensor.

2. The sensor of claim 1 wherein said core further includes:

third and fourth members, said third member extending from said center portion in a direction substantially parallel to the direction of grain alignment and terminating at a third end distal from said center portion, said fourth member extending from said center portion in a direction substantially perpendicular to the direction of grain alignment and terminating at a fourth end distal from said center portion;

a third detection coil that develops a third metric in response to the generated magnetic flux, said third metric changing when the magnetic flux changes as a result of applied stress, said third detection coil being operatively associated around said third member near said third end of said third member; and a fourth detection coil that develops a fourth metric in response to the generated magnetic flux, said fourth metric changing when the magnetic flux changes as a result of applied stress, said fourth detection coil being operatively associated around said fourth member near said fourth end of said fourth member, said first, second, third and fourth detection coils being operatively connected such that said first, second, third and fourth metrics are summed together to increase the sensitivity of said sensor.

3. A sensor for sensing stress applied to an object, said sensor comprising:

a grain-aligned portion having grains aligned in a direction parallel or perpendicular to the direction of stress, said grain-aligned portion being operatively associated with the object such that stress applied to the object is applied to said grain-aligned portion in a direction parallel or perpendicular to the direction of grain alignment;

first detection means aligned parallel to the direction of stress for detecting changes in a characteristic of said portion that changes as a result of applied stress, said first detection means developing a first detection metric that changes in response to changes in the characteristic that occur in a direction parallel to the direction of applied stress, said first detection means outputting a first signal indicative of the changes in said metric, and second detection means aligned perpendicular to the direction of stress for detecting changes in the characteristic, said second detection means developing a second detection metric that changes in response to changes in the characteristic that occur in a direction perpendicular to the direction of applied stress, said second detection means outputting a second signal indicative of the changes in said metric, said first and second detection means being operatively connected such that said first and second output signals are summed together.

4. A sensor for sensing stress applied to an object, said sensor comprising:

a grain-aligned portion having grains aligned in a direction parallel or perpendicular to the direction of stress, said grain-aligned portion being operatively associated with the object such that stress applied to the object is applied to said grain-aligned portion in a direction parallel or perpendicular to the direction of grain alignment;

detection means for detecting changes in a characteristic of said portion, the characteristic changing as a result of applied stress, said detection means developing a detection metric functionally related to the characteristic, said detection metric changing in response to changes in the characteristic, said sensor outputting a signal indicative of more than two times the change in said developed metric.

* * * * *